United States Patent [19]

Chaouloff et al.

[11] Patent Number: 4,519,416

[45] Date of Patent: May 28, 1985

[54] SAFETY CONNECTION CONNECTING A VESSEL CONTAINING A GAS UNDER PRESSURE TO A DISCHARGE SYSTEM

[75] Inventors: Michel Chaouloff, Paris; Michel Bernicot, St. Germain-en-Laye; Pierre Douineau, Coulans; Roger Boret, Le Vesinet, all of France

[73] Assignee: Compagnie Francaise des Petroles, France

[21] Appl. No.: 515,430

[22] Filed: Jul. 20, 1983

[30] Foreign Application Priority Data

Jul. 22, 1982 [FR] France ..................... 82 12774

[51] Int. Cl.[3] ..................... F16K 31/12

[52] U.S. Cl. ..................... 137/488; 137/495

[58] Field of Search ..................... 137/488, 485, 338, 340, 137/495, 489; 251/86

[56] References Cited

U.S. PATENT DOCUMENTS

| | | | |
|---|---|---|---|
| 3,227,171 | 1/1966 | Woefel | 137/488 X |
| 3,253,611 | 5/1966 | Cummins | 137/338 |
| 3,754,566 | 8/1973 | Gemigniani | 137/88 |
| 4,016,901 | 4/1977 | Kenny | 137/340 |
| 4,200,116 | 4/1980 | Gemignani | 137/492 |
| 4,235,416 | 11/1980 | La Coste | 251/86 |
| 4,291,721 | 9/1981 | Gemignani | 137/492 |

*Primary Examiner*—Alan Cohan

*Attorney, Agent, or Firm*—Sughrue, Mion, Zinn, Macpeak, and Seas

[57] ABSTRACT

A safety connection located between a vessel containing a gas under pressure and a gas discharge system comprises a pilot controlled valve which is provided with a separate control system for opening the valve, the valve having a ball-and-socket system between the actuating rod and the valve-closing flap which it carries, so that the valve can also function as a sluice so as to avoid the need to provide a second pipe connected to the vessel and provided with a sluice as is conventional.

The actuating rod of the valve carries a piston, one face of which is normally subject to the pressure of fluid in the vessel via the pilot valve but is connected to a vent as soon as an overpressure occurs, to open the valve. The other face of the piston is normally connected to a vent but is subject to the pressure of a fluid from an independent source of control fluid when the separate control system is operated to open the valve.

4 Claims, 6 Drawing Figures

SAFETY CONNECTION CONNECTING A VESSEL CONTAINING A GAS UNDER PRESSURE TO A DISCHARGE SYSTEM

The invention relates to a safety connection comprising a valve and a pipe which connect in series a vessel containing a gas liable to be under pressure to a system intended for discharging the excess gas released by the valve. Such a safety connection is used, in particular, in the oil industry and the chemical industry where the excess gas is, if appropriate, discharged into the environment after undergoing treatment, for example, combustion.

The invention has particular but not exclusive application to vessels containing hydrocarbons and more particularly to those located on sea platforms, because this is where the saving of space and the reduction in weight which can be achieved by means of the invention are most desirable, although the invention can provide a considerable saving in all cases of use.

It is generally necessary, because of operational needs and to increase safety, to place in parallel with the pipe provided with a safety valve a second pipe equipped with a sluice controlled manually or automatically to discharge the gas in the vessel very quickly, especially if a fire occurs.

According to the invention there is provided a safety connection between a vessel containing a gas under pressure and a gas discharge system, comprising the connection in series of a pipe and a valve provided with a closing flap carried by an actuating rod controlled by a pilot which triggers the opening of the valve in the event of overpressure in the vessel, a separate control system for displacing the actuating rod in such a way as to open the valve and pivoting means between the actuating rod and the closing flap so that the valve can also function as a sluice ensuring good leak-proofing even after a plurality of openings, despite any deformations which may be brought about by temperature changes.

The need to install, in parallel with the connection between the said pipe and the said valve, another pipe provided with a sluice can thus be avoided. The reduction in weight which can be obtained is especially important in an oil installation located on a sea platform.

Advantageously the actuating rod is provided with a double-acting piston, one face of which is designed to be subject to the pressure of the gas contained in the vessel, which is transmitted by the pilot valve, and the opposite face of which is designed to be subject to the pressure of a separate control fluid coming from a separate source of fluid under pressure and taking effect when the valve is used as a sluice.

Preferably switching means for fluids are located between the valve, the pilot, the source of fluid under pressure and a system for discharging the control fluid, for changing the valve over from operating as a valve to operating as a sluice. The switching means may comprise a five-way cock, which makes it easy, in particular, to make the switching operation automatic.

Thermal barrier means may be provided to limit the transmission of temperature variations from the region of the closing flap towards the control region of the valve-actuating rod via the actuating rod and/or via the body of the valve.

An embodiment according to the invention will now be described, by way of example only, with reference to the accompanying drawings.

Figure 2:
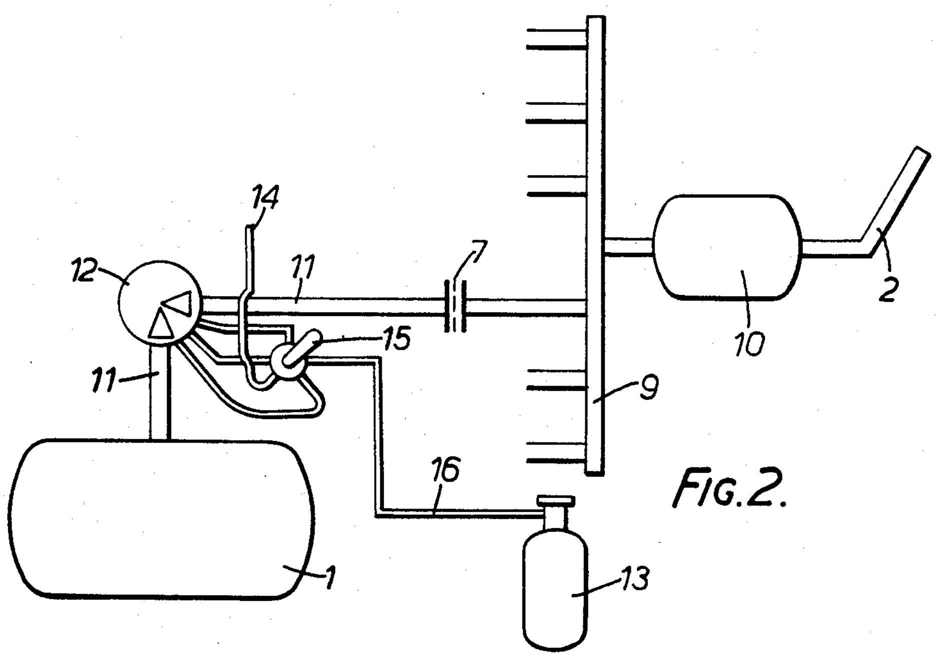
FIG. 2 is a diagrammatic representation of an embodiment of safety installation according to the present invention.
Figure 3:
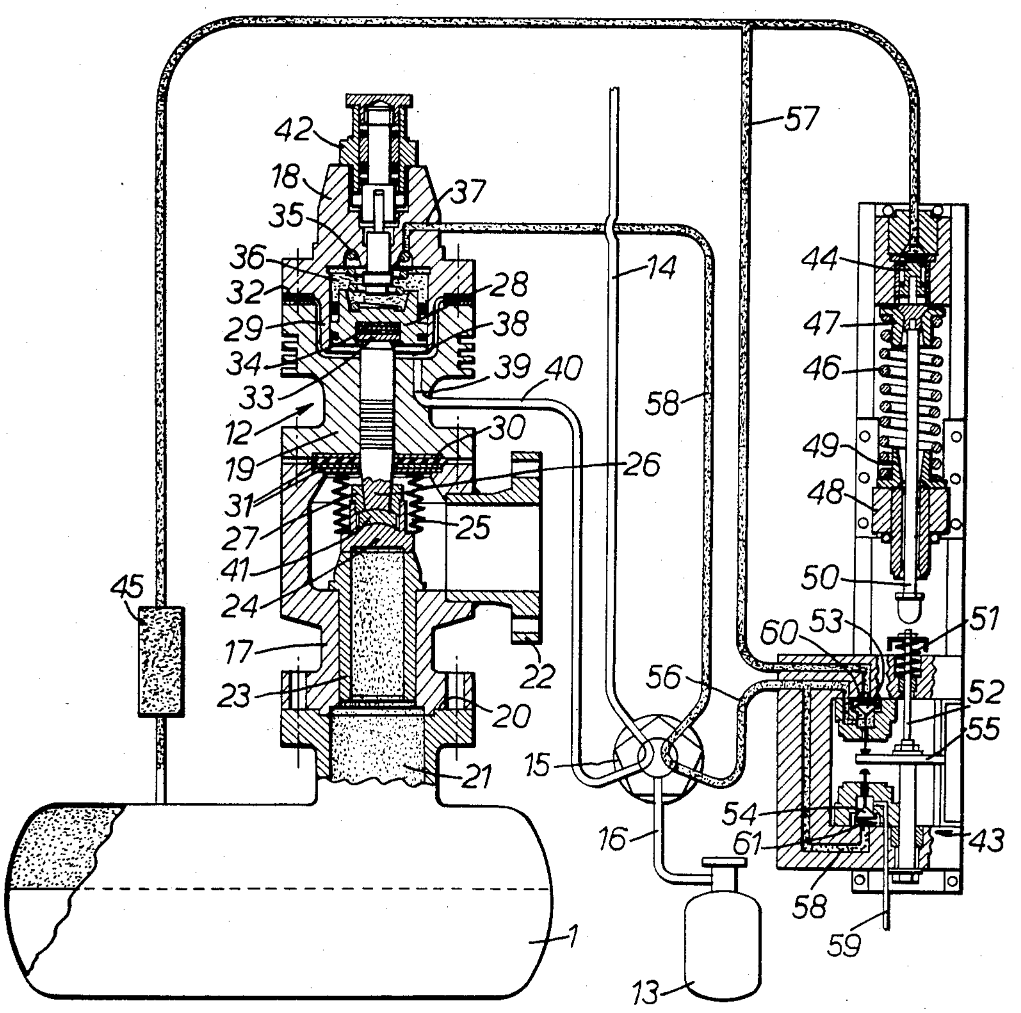
Figure 4:
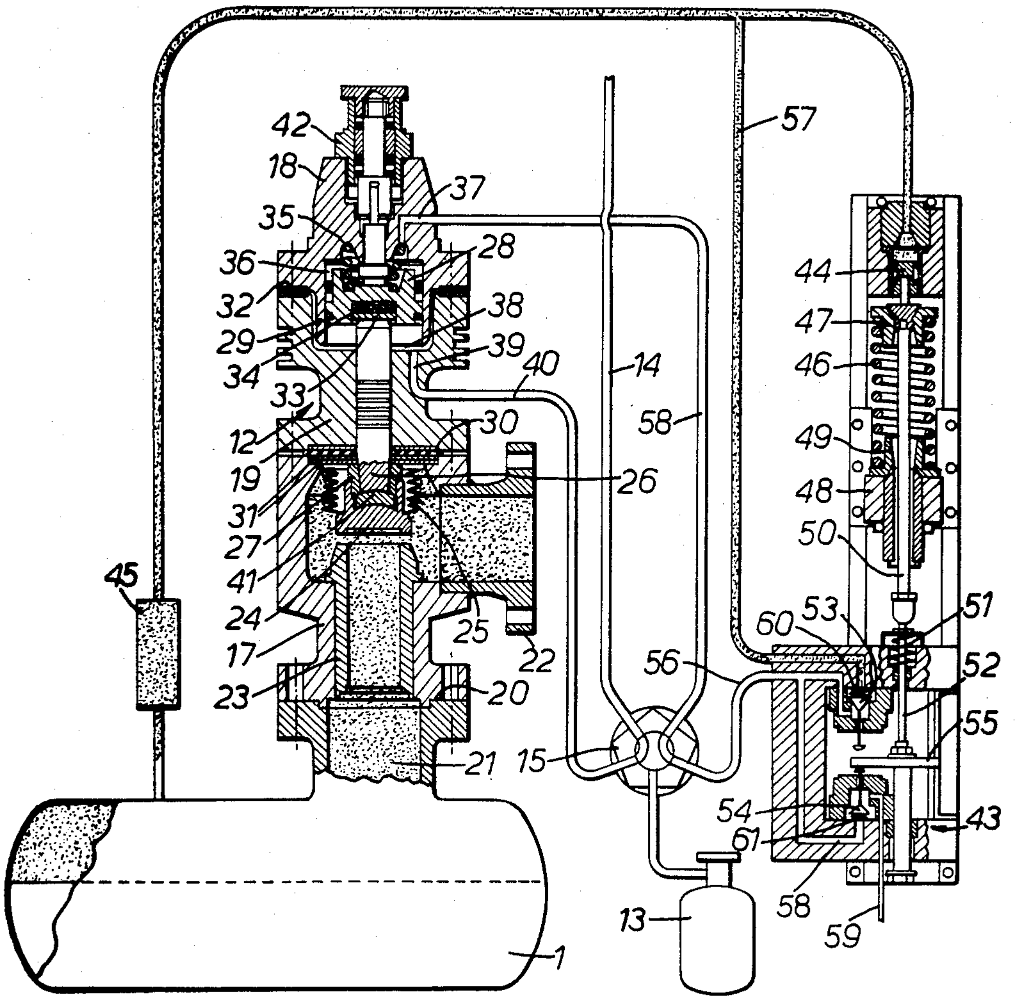
Figure 5:
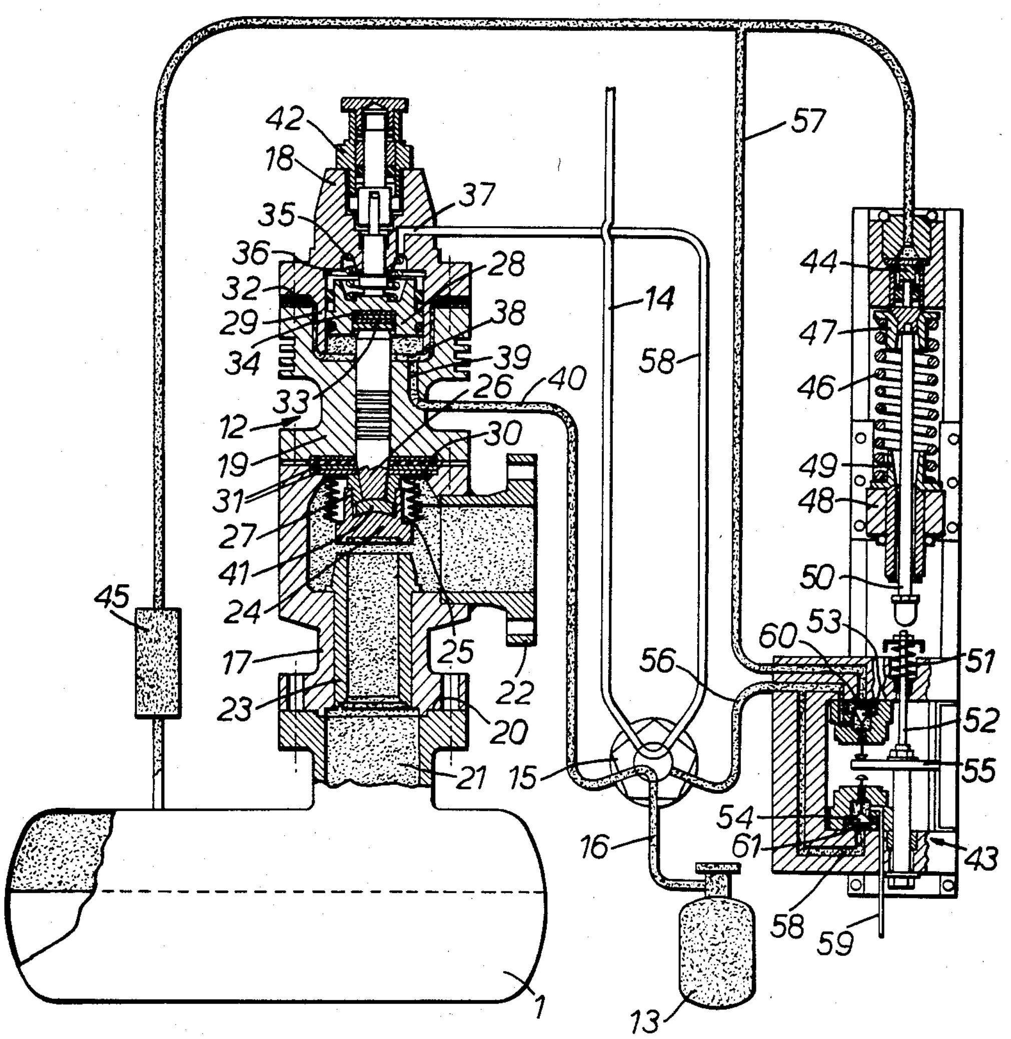
Figure 6:
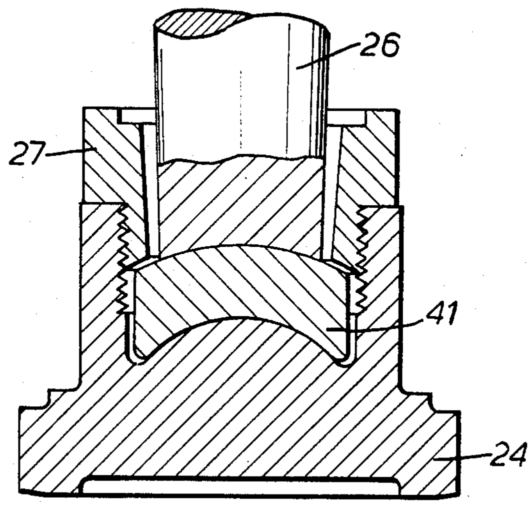

FIGS. 3, 4 and 5 are similar sections through a valve and pilot assembly suitable for being used in the installation of FIG. 2: in FIG. 3, the valve is in normal operation, whilst in FIG. 4 the valve is open in response to an overpressure detected by the pilot, and in FIG. 5 the valve is open in response to actuation of the valve functioning as a sluice; and FIG. 6 is a section on a larger scale through the flap of the valve and its assembly device.

Figure 1:
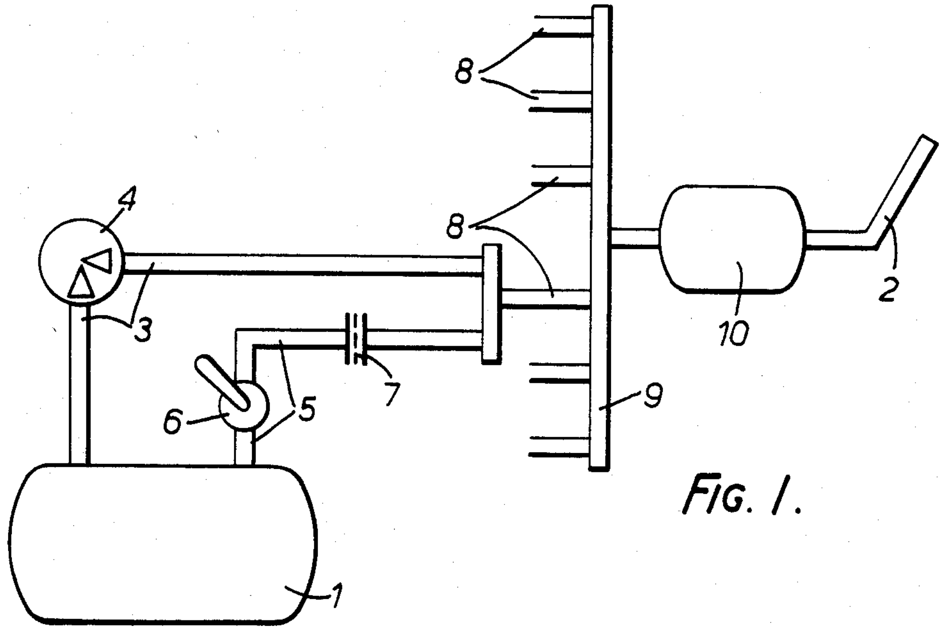
FIG. 1 is a diagrammatic representation of a known type of safety installation.

In the diagram of FIG. 1, a vessel 1 containing a gas under pressure is linked to a discharge system 2, for example a flare, by two parallel pipes: a pipe 3 provided with a safety valve 4 which opens as soon as the pressure of the gas in the vessel 1 exceeds a predetermined threshold, and a pipe 5 provided with a sluice 6 actuated manually or automatically and, if appropriate, with a throttle orifice 7. This throttle orifice 7 becomes necessary only if the difference between the operating pressures of the vessel 1 and of the gas discharge system 2 is greater than the pressure drop in the sluice 6 and the pipes connecting the vessel 1 to the discharge system 2 by means of the sluice 6.

The two pipes 3 and 5 are connected by a pipeline 8 to a collector 9 into which open other pipelines 8 similar to that which has just been mentioned and intended for protecting other vessels, such as the vessel 1, each provided with two pipes, such as the pipes 3 and 5. The collector 9 is linked to the gas discharge system 2 by means of a tank 10 for separating the liquid products.

The vessel 1, the collector 9, the tank 10 and the discharge system 2 may be seen again in FIG. 2. However, the vessel 1 in FIG. 2 linked to the collector 9 only via a single pipe 11 provided with a special pilot-controlled valve 12, an embodiment of which is illustrated in FIGS. 3, 4 and 5. This valve 12 can be opened either as a result of overpressure of the gas in the vessel 1 acting on the pilot of the valve, as will be seen below, or as a result of the actuation of a five-way cock 15, one way of which is connected to a vent 14 and another to a duct 16 which conveys a control fluid coming from a source 13, such as a bottle of compressed gas. This five-way cock 15 can be actuated either manually or automatically. The five-way cock 15 can be replaced, if appropriate, by other switching devices carrying out similar operations.

The simplification provided by the arrangement of FIG. 2 will thus be seen, and the elimination of one of the pipes 3 or 5 of FIG. 1, which are of large diameter and which can be of great length, therefore represents a considerable saving and a substantial reduction in weight.

The valve 12 illustrated in FIGS. 3, 4 and 5 comprises three elementary bodies: a lower extreme elementary body 17, an upper extreme elementary body 18 and an intermediate elementary body 19. The body 17 incorporates a flange 20 for connected to the wall of the vessel 1 round an orifice 21 in the latter, and a flange 22 for connection to a flange (not shown) of the discharge pipe. It contains a nozzle 23 and a closing flap 24 provided with a bellows 25 and carried by the lower end of an actuating rod 26 by means of a nut 27. The rod 26 passes through the body 19 and it carries at its upper end a piston 28 which can slide in a cylinder 29 formed in the body 18.

The intermediate elementary body 19 is connected to the lower elementary body 17 by being fastened to the latter by pins, the location of which is merely indicated. A thermal insulation assembly is interposed between these two bodies; it consists of a protective screen 30 and several discs made of thermally insulating materials 31. The extreme elementary body 18 is connected to the intermediate elementary body 19 by being fastened to the latter by nuts, only the location of which has been shown, with discs made of thermally insulating materials 32 being interposed. The rod 26 is attached to the piston 28, with a protective screen 33 and washers made of thermally insulating materials 34 being interposed, the assembly being retained by circlips. A thermal barrier can also be interposed between the flap 24 and the rod 26. This thermal insulation provides substantial protection for the drive members of the rod 26. There is, acting between the upper face of the piston 28 and the body, a conical helical spring 35 which tends to push the piston 28 downwards to apply the flap 24 against the upper end of the nozzle 23 The stress exerted by this spring 35 on the flap 24 is less than the force exerted in the opposite direction on the flap 24 by the maximum pressure of the gas in the vessel 1 which, according to the regulations in force, is permissible at the end of depressurisation of the vessel 1. The upper face of the piston 28 forms, together with the lower face of the body 18, a first chamber 36 which can be made to communicate via the duct 37 either with the gas in the vessel 1 by means of a pilot valve or with the atmosphere via the vent 14, depending on the position of the three-way cock 15.

On the opposite side, the lower face of the piston 28 borders a second chamber 38 also delimited by the cylinder 29 of the body 18, the rod 26 and the body 19. This chamber 38 communicates via an inner duct 39 with an outer tubing 40 which fits on the five-way cock 15 and is normally connected to vent 14 but can be connected to the source 13. Thus, when the pressure of the gas in the vessel 1 becomes insufficient to keep the flap 24 open against the spring 35, the opening of the valve 12 can be maintained, against the bias of the spring 35, by the action of the fluid under pressure introduced via the tubing 40 and the duct 39 into the chamber 38.

FIG. 6 shows more clearly the assembly of the flap 24 on the lower end of the actuating rod 26. This actuating rod 26 forms a shoulder 41 in its lower part and has a lower end surface in the form of a portion of a sphere. The flap 24 has in its upper part a corresponding surface in the form of a portion of a sphere, which comes up against the end surface, in the form of a portion of a sphere, of the actuating rod 26, and the assembly consisting of the flap 24 and the nut 27 screwed on it forms a jaw device which grips the shoulder 41 with a slight play, making it possible for the corresponding part spherical surfaces of the flap 24 and the actuating rod 26 to slide on one another, if appropriate, so as to constitute a ball-and-socket system. This ball-and-socket system ensures that the flap 24 is presented to the upper end of the nozzle 23 in the proper way, and it thus contributes to maintaining good leak-proofing after several openings of the valve, the latter moreover being machined with high precision.

Furthermore, the body 18 contains a clamping rod 42 made in two parts.

FIGS. 3, 4 and 5 illustrate a pilot valve associated with the valve 12. This pilot valve 43 comprises an upper auxiliary piston 44, the upper face of which is in contact with the gas in the vessel 1 by means of a filter 45. The gas acting on this upper auxiliary piston 44 tends to compress an adjusting spring 46 on which the piston 44 acts by means of a cup 47. The force to be exerted on the spring 46 can be adjusted by raising or lowering an intermediate block 48 which supports the lower end of the spring 46 by means of another cup 49. The piston 44 transmits its movement via a rod 50 to a control rod 52 provided with a restoring spring 51 which biasses the control rod back into its upper position and which acts on flaps 53 and 54 by means of a cam 55.

The flap 53, when lifted by the cam 55, causes a duct 56 connected to one of the ways of the five-way cock 15 to communicate with a duct 57 connected to the vessel 1 by means of the filter 45. The flap 54, when lowered by the cam 55, causes a duct 58 connected to the duct 56 to communicate with a vent 59. A spring 60 normally keeps the flap 53 in the closed position and a spring 61 normally keeps the flap 54 in a closed position.

FIG. 3 shows the assembly during normal operation. The pressure in the vessel 1 is not sufficient to compress the adjusting spring 46 of the pilot 43 by means of the piston 44. The rod 52 is therefore maintained in the "upper" position by the spring 51, and the cam 55 pushes the flap 53 upwards, thus allowing communication between the ducts 56 and 57 and permitting the chamber 36 to be filled with the gas coming from the vessel 1 while the spring 61 keeps the flap 54 in the closed position. Because the gas in the chamber 36 comes from the vessel 1 and is therefore at the same pressure as that of the gas in the vessel 1, and because the diameter of the piston 28 is greater than that of the flap 24, the force exerted by the gas in the chamber 36 on the piston 28 outweighs that exerted by the gas in the vessel 1 acting directly on the flap 24, thus forcing the flap 24 against the nozzle 23. The valve 12 then remains in the closed position.

FIG. 4 shows the effect of a pressure of the gas acting on the piston 44 which is higher than the pressure of the spring 46. This gas compresses this spring by means of the piston 44, and the rod 50 pushes the rod 52 downwards, thus closing communication between the ducts 56 and 57 because of the closure of the flap 53. However, the cam 55 opens the flap 54, and the duct 56 communicates with the atmosphere via the duct 58 and the vent 59. The chamber 36 is therefore brought to atmopsheric pressure, and the only force tending to close the valve is that exerted by the spring 35, the sole purpose of which is to urge the flap 24 against the nozzle 23 during the filling of the vessel 1: the valve opens.

FIG. 5 shows how the opening of the valve 12 can be brought about by an action external to the pilot 43. When the five-way cock 15 is rotated, not only is the chamber 36 brought to atmospheric pressure, but also the external source of compressed gas 13 fills the chamber 38 and thereby exerts on the piston 28 an upward-directed force greater than that exerted by the spring 35. Whatever the pressure of the gas in the vessel 1, the valve 12 opens.

It will be noted that the valve 12 has only two normal operating positions, the open position and the closed position, which correspond to stationary states of the valve. The fluid which determines the open position or closed position of the valve is not in circulation during a stationary state of the valve, and therefore it cannot cause an abrupt change in position of the valve as a result of the obstruction of a duct which could be produced by the circulation of a fluid (the formation of hydrates, solid plugs, etc.)

There is thus provided a connection by which it is possible to eliminate one of the two pipes of the known systems whilst maintaining the same operational reliability and flexibility. The only pipe to be maintained is that incorporating the valve which combines the safety properties of a conventional valve (reliability of opening) with that of a depressurising sluice (leak-proof after many openings and resistance to cooling attributed to expansion of the gas, this cooling being to a temperature which can fall far below 0° C.).

What is claimed is:

1. A safety connection, located between a vessel containing a gas under pressure and a gas discharge system, and comprising:

a discharge pipe in series with a valve (12) movable in both an opening and a closing direction, said valve comprising:

an actuating rod (26) having an upper end and a lower end, a closing flap (24) pivotally coupled to said lower end, a piston (28) coupled to said upper end, said piston (28) having a first face which is directed away from said closing flap, which borders a first chamber (36), and a second face opposite said first face and which borders a second chamber (38), and mechanical means (35) for biasing said actuating rod (26) in said closing direction;

switching means (15) for directing said gas under pressure;

an external source (13) for compressed gas coupled to said switching means for opening said valve (12) as a sluice;

a duct (37) having two ends, wherein one end is coupled to said first chamber (36) and wherein the other end is coupled to said switching means;

a vent tube (14) having two ends, wherein one end is coupled to the atmosphere and wherein the other end is coupled to said switching means;

a pilot valve (43) for coupling said duct (37) to either said vessel (1) during normal operation, or to the atmosphere in case of an overpressure in said vessel (1); and a tubing (40) having two ends, wherein one end is connected to said second chamber (38) and the other end is connected to said switching means (15);

wherein, during a first state, said duct (37) is coupled to said pilot valve (43) through said switching means (15), and said tubing (40) is coupled to said vent (14) through said switching means (15); and wherein, during a second state, said duct (37) is coupled to said vent (14) through said switching means (15), and said tubing (40) is coupled to said external source of compressed gas (13) through said switching means (15), said valve (12) operating as a normal valve in said first state, and said valve operating as a sluice in said second state.

2. A safety connection according to claim 1, wherein said switching means comprises a five-way cock.

3. A safety connection according to claim 1, comprising thermal barrier means which are interposed between said actuating rod and at least one of said closing flap and said piston.

4. A safety connection according to claim 1, wherein said valve comprises two extreme elementary bodies and an intermediate elementary body located therebetween and surrounding said actuating rod, one said extreme body containing said closing flap and the other said extreme body containing said piston, thermal barrier means being interposed between said intermediate body and at least one of said extreme bodies.

* * * * *